United States Patent Office 3,227,516
Patented Jan. 4, 1966

3,227,516
RECOVERY OF ACTINIDE VALUES
Edward L. Cole, Fishkill, Edwin C. Knowles, Poughkeepsie, and Howard V. Hess, Glenham, N.Y., assignors to Texaco Inc., New York, N.Y., a corporation of Delaware
No Drawing. Filed Mar. 5, 1963, Ser. No. 263,069
10 Claims. (Cl. 23—14.5)

This invention relates to recovering actinide values from aqueous acidic solutions and more particularly to a process of recovering actinide values by the use of the combination of solvent extraction and hydrogen pressure precipitation.

The prior art processes of recovering actinide metals, such as plutonium, uranium, thorium, neptunium, and protactinium are numerous. For example, using uranium and sulfuric acid as specific examples, one process extracts actinide values from ores by first leaching the ore with an aqueous mineral acid, e.g., $H_2SO_4$, $HNO_3$, $H_3PO_4$, or HCl in order to place the actinide metal value into solution. The actinide value is leached out as the water soluble uranyl ion ($UO_2^{++}$), undissociated uranyl sulfate ($UO_2SO_4$), and as the uranyl polysulfate anions, e.g.

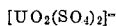

and

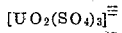

The next step calls for the extraction of the uranium metal salt from the acid leach liquor with organic amines. Extensive lists of organic amines which have been tested for the extraction of uranium from acid solutions are given in the report of Kraus et al., Oakridge National Laboratory Report ORNL 1959, issued November 18, 1955, and the report of Preuse et al., U.S. Atomic Energy Commission report RMO 2533, dated April 14, 1955. The uranium salt complexes with the amines to form aqueous insoluble and organic solvent soluble uranyl sulfate-amine complex. The amine-uranium metal complex is then chemically reacted with ammonium nitrate in aqueous nitric acid which converts the uranium in the complex to a water-soluble uranyl nitrate which is re-extracted into the aqueous ammonium nitrate phase. The aqueous solution of uranyl nitrate is reacted with magnesium oxide to precipitate the uranium as magnesium diuranate ($MgU_2O_7$). The diuranate precipitates are recovered and heated. The heating converts the diuranate into uranyl oxide ($U_3O_8$). The solid uranium oxide is then converted into uranous oxide ($UO_2$) by reduction, e.g., by contacting with $NH_3$ at 750° C. The formed $UO_2$ is treated with anhydrous HF to convert it unto uranous tetrafluoride from which the pure uranium metal is derived by contacting $UF_4$ with Mg or Ca or $CaH_2$. The latter steps are necessary since $U_3O_8$ is relatively inert and cannot be fluorinated directly.

The foregoing process although recovering actinide metal values under commercial conditions has the following disadvantages:

(1) Solid and/or liquid reagents are required to decompose the complex amine-actinide salt and to precipitate the actinide values from the re-extraction solution. These two solid and/or liquid chemical reaction steps require additional apparatus and handling.

(2) The actinide metal is usually recovered from the amine in the "ic" state, e.g., $U_3O_8$. $U_3O_8$ is relatively inert for conversion into the uranous tetrafluoride. Therefore, a further chemical treatment such as reduction with ammonia is required to put the actinide metal into the more reactive form, i.e., into $UO_2$.

(3) A small but significant percentage of actinide metal value is continuously lost in the discarded raffinate from the acid leach step.

We have discovered, and this constitutes our invention, a process whereby the aforedescribed prior art process is modified to the extent that (1) the actinide values are precipitated from an organic extraction solution without requiring the use of solid or liquid chemical reactants thereby permitting the use of simplified equipment and less costly reagents, (2) the actinide values are precipitated from organic solvent extraction solution in the relatively active actinous form which permits conversion of the actinous oxide to the fluoride without further chemical treatment.

A further embodiment of our process allows the recovery of actinide metal values from the raffinate acid leach step in addition to the recovery of the actinide values from the organic solvent extraction solution. The result is a considerable saving in process costs per unit of actinide metal produced.

In accordance with one embodiment of our invention, actinide metal bearing ore is crushed in a crushing step and ground desirably with water to produce a particulate ore, advantageously between about 10 and 40 mesh (Tyler Standard Screen Scale). The ground ore is then contacted with an excess of an aqueous mineral acid to leach out the actinide values of the ore as water soluble actinide salts of the leach acid. Suitable mineral acids are $H_2SO_4$, $HNO_3$, $H_3PO_4$ and HCl. The leaching acid strength is dependent on the type of acid employed. In an aqueous sulfuric acid leach solution the acid strength desirably between about 1 and 3 wt. percent. During the acid leach treatment an oxidizing agent may be added such as manganese dioxide, chlorate ion, chlorine, or ferric ion, in an amount between about 2 and 30 pounds per ton of ore processed for the purpose of putting the actinide metal value in a higher valence state, if said higher state renders the actinide value more soluble in the aqueous leach solution. The leaching step may be effected in conventional liquid-solid contacting equipment, for example, mixer agitated tanks. The resultant actinide loaded leach liquor, if desired, may be subjected to a clarifying step effecting separation of the solution from the insoluble residue of the raw ore. Clarification may be effected in conventional equipment such as thickeners, filters, and the like. The residual ore is discarded.

The actinide values are recovered from the loaded leach liquor together with some extraneous metal impurities by a process which comprises contacting said actinide containing solution with an organic solution comprised of a substantially inert, water-insoluble, liquid, nonpolar, organic extractant and an amine of the formula:

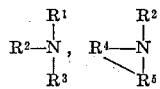

and

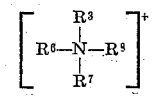

where $R^1$ and $R^2$ are selected from the group consisting of hydrogen, alkyl radicals, and alkyl and alkylene radicals having at least one substituent selected from the group consisting of aryl, hydroxyl, amino and alkoxyl and where $R^3$, $R^6$, $R^7$, and $R^8$ are selected from the group consisting of alkyl radicals and alkyl and alkylene radicals having at least one substituent selected from the group consisting of aryl, hydroxyl, amino and alkoxyl and $R^4$ and $R^5$ represent a polymethyl group, the total number of carbon atoms in said amine being at least 10. The temperature of amine-leach liquor contact is advantageously between about 18 and 50° C. The concentration of amine complexing agent in organic extractant is advantageously between about 3 and 5 wt. percent amine and the mol ratio of said amine and said actinide value is desirably between about 1:1 and 2:1. The amine forms a complex compound with the actinide value which is soluble in the organic extractant phase and is dissolved therein. The stripped leach liquor is separated, e.g., as a raffinate phase in countercurrent extraction, and the removal of the residual actinide values therefrom, if desired, is later described.

The leaching of the actinide values from the ore and the conversion of the values from a water soluble organic insoluble value to a water insoluble organic soluble value can be described by chemical equations below using uranium ore, sulfuric acid and a secondary amine in kerosine solvent:

$U_3O_8$ (uranium ore) $+$ aq. $H_2SO_4 \longrightarrow$

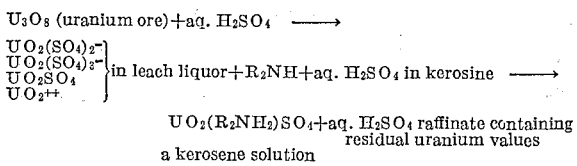

$UO_2(R_2NH_2)SO_4+$aq. $H_2SO_4$ raffinate containing
residual uranium values
a kerosene solution After the extraction of the actinide values from the acid leach solution, the loaded organic solvent is then contacted with hydrogen preferably under agitated conditions under a hydrogen pressure of between about 100 and 2000 p.s.i.g. at a temperature between about 50 and 250° C. The actinide metal precipitates out of the organic solvent as the "ous" oxide, e.g., $UO_2$ and the precipitated oxide is recovered by standard means such as filtration. In a continuous or batch operation the stripped amine-organic solvent solution can be recycled to the extraction step for further recovery of actinide metal value from fresh acid leach solution.

Under advantageous conditions during the treatment of the amine extract solution with hydrogen, water is also present as a separate phase, preferably in an amount between about 10 and 60 volume percent of the total mixture. It has been found that the actinide values precipitate out more easily in the presence of water. It is theorized that the water enters into the amine complex to form an "aquo" complex which is much easier to break than a non-"aquo" amine complex. Under more advantageous conditions the water contains between about 0.5 and 10 wt. percent inorganic salts such as ammonium sulphate, ammonium acetate, ammonium citrate, or ammonium borate to prevent emulsions from forming in the aqueous phase.

Also under advantageous conditions a metal hydrogenation catalyst is employed in the hydroprecipitation step such as nickel chips or rhodium plated on the inner surface of the hydroprecipitation apparatus. The catalyst is present, desirably in an amount between about 0.005 and 5 wt. percent of the liquid solution present. Other examples of hydrogenation catalysts contemplated herein are the Group VI and Group VIII metals of the Periodic Table and their oxides, such as platinum, palladium, cobalt, cobalt-nickel, uranium oxide, molybdenum oxide, nickel oxide-tungsten oxide and iridium. The physical form of the catalyst can either be as a slurry of particulate metal, a foil, or more advantageously deposited on a substrate of aluminum, anodized aluminum, titanium, stainless steel, silicon oxide, aluminum oxide, zirconium oxide, carbon, or cracking catalyst.

Still further, under advantageous conditions and to facilitate the contact of the hydrogen with the extractant solution containing the actinide-amine complex, the contact is conducted with agitation, e.g., by passing the solution and hydrogen mixture through a turbulent flow hydrogenerator. One example of a turbulent flow hydrogenerator is tubular piping having angles in its length so constructed as to produce turbulence operated at flow rates having Reynolds numbers of between about 1000 and 10,000.

In the above described process it is theorized that the gaseous hydrogen contact with the complex amine-actinide metal salt results in a decomposition of the amine complex into the "ous" oxide and the amine sulfate. This chemical reaction is exemplified by the following equations utilizing a secondary amine and uranium as examples:

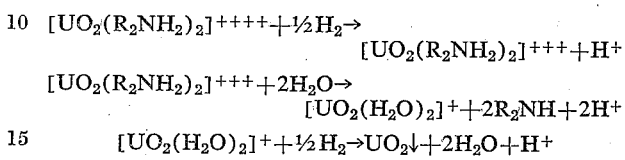

As another embodiment of our invention and in order to recover a maximum amount of actinide metal value, the aqueous stripped raffinate from the organic amine solvent extraction step is also subjected to hydrogen under pressure, advantageously at a temperature between about 50 and 250° C., under a hydrogen pressure of between about 100 and 2000 p.s.i.g. Advantageously, about 0.005 and 5 wt. percent of previously described hydrogenation catalyst, based on the liquid present, is also added prior to the hydrogen pressuring. The hydrogen pressuring precipitates actinide metal values as the actinic metal oxide, e.g., $U_3O_8$. Other metals may precipitate as impurity and be separated from the actinide metal value and from one another by standard chemical means.

In order to insure maximum yields, a small amount of base (e.g., $NH_4OH$) may be desirably added to the stripped acid leach solution before hydrogen pressuring in order to prevent an excess of hydrogen ion concentration, and thereby permitting the chemical equilibrium to favor the complete precipitation of the actinide value.

In respect to the organic solvent utilized in the amine complex extraction step, we have found that aliphatic hydrocarbons, aromatic solvents, aromatic petroleum fractions, ketones, nitro-hydrocarbons and chlorinated solvents to be suitable diluents. Specific examples are aromatic petroleum fractions having a boiling point between 284 and 425° F., benzene, toluene, xylene, decane, nitrobenzene, and chlorobenzene. Kerosine is typical of the aliphatic hydrocarbon diluents. Kerosine is a suitable diluent for most long branched chain amines. In addition, kerosine improves the selectivity of the extractant for the actinide metals and sometimes improves the rate of phase separation. Kerosine, modified with a long chain alcohol is a suitable diluent for symmetrical tertiary amine complexing of shorter carbon chain lengths as illustrated by tri-n-octylamine and triisooctylamine.

Specific examples of the amine complexing agents for the amine extraction step contemplated herein are described in U.S. Patent No. 2,877,250 as follows:

PRIMARY AMINES

"Armeen 10D" (90% n-decylamine, 7% laurylamine, 3% n-octylamine); "Armeen TD" (a mixture of amines comprised of hexadecylamine, octadecylamine, and octadecenylamine and derived from tallow fatty acids); 1-isobutyl - 3,5 - dimethylhexylamine; 3 - ethyl - 1 - isobutyloctylamine; 1-heptyloctylamine; 1-(3-ethylpentyl)-4-ethyloctylamine; 1-undecyldodecylamine; "Primene 81T" (trialkylmethylamine, 12 to 15 carbon atoms); "Primene JM" (trialkylmethylamine, 18 to 24 carbon atoms).

SECONDARY AMINES

Di-n-heptylamine; di-n-octylamine; di-n-decylamine, di-laurylamine; di-n-tetradecylamine; di-n-hexadecylamine; di-n-octadecylamine; dibenzylamine; di-α-methylbenzylamine; di - 2 - ethylhexylamine; bis - (2 - methylcyclohexylmethyl) amine; bis-(di-isobutylmethyl) amine; di-"oxo" decylamine (branched primary alkyls); bis-(1-methyl-4-ethyloctyl) amine; di-2-butyloctylamine; "Amine S-24,"

bis - (1 - isobutyl - 3,5 - demethylhexyl) amine; N-methyllaurylamine; N - (2 - ethylhexyl) - 1 - isobutyl - 3,5 - dimethylhexylamine; N-(2-ethylhexyl)-2-pentylnonylamine; N-(1-isobutyl-4-ethyloctyl)-n-decylamine; "R&H9D–178" (N - dodecenyltrialkylmethylamine, 24 to 27 carbon atoms); "R&H FO–317" (N - dodecenyltrialkylmethylamine, 30 to 36 carbon atoms); N-benzyllaurylamine; N - benzyl - n - tetradecylamine; N - benzyl - 1 - isobutyl - 4 - ethyloctylamine; N - benzyl - 1 - (3 - ethylpentyl) - 4 - ethyloctylamine; N - γ - methylbenzyl - 2 - ethylhexylamine; N - γ - xylybenzyl - 2 - ethylhexylamine; N - 3 - phenylpropyl - n - tetradecylamine; N - (2 - naphthyl) methyl - 1 - isobutyl - 3,5 - dimethylhexylamine, N - β - (di - n - heptylmethyl) amino - ethyl - (di - n - heptylmethyl) amino - ethyl - (di - n - heptyl) methylamine (i.e., N,N' - bis(1 - heptyloctyl) - ethylenediamine); "Duomeen S" (N - γ - propylaminoalkylamine, the alkyl—principally hexadecyl, octadecyl, octadecenyl, and octodecadienyl and is derived from soybean oil).

HETEROCYCLIC SECONDARY AMINES n-Heptadecylglyoxalidine.

TERTIARY AMINES

Tri - n - butylamine; tri - n - hexylamine, tri - n - octylamine, tri - n - decylamine; tri - laurylamine; tri - iso-octylamine; tris-(tridecyl "B")-amine (branched primary alkyls); N - methyldi - n - octylamine; N - methyldi - n - decylamine; N - methyldilaurylamine, N - methyldi - n - octadecylamine; N - methyl - di - 2 - ethylhexylamine; N - lauryldimethylamine; N - lauryldiethylamine; N-lauryldi - n - butylamine; β - lauryldi - n - hexylamine; N - lauryldibenzylamine; N - benzyldilaurylamine; N - propyldi - n - decylamine; N - butyldi - 3,5,5 - trimethylhexylamine; N - butyldidecenylamine, N - β - hydroxyethyldilaurylamine; N - β - hydroxyethyldi - 2 - ethylhexylamine; "Ethomeen S–15," N - alkyl - bis(hydroxy - polyethoxyethyl) amine; reaction product of one mole Armeen SD with 5 moles ethylene oxide; "Ethomeen S–60" (N-alkyl - bis - (hydroxypolyethoxyethyl)amine; reaction product of one mole of Armeen SD with 50 moles ethylene oxide.

HETEROCYCLIC TERTIARY AMINES

N-n-decylpiperidine, N-"coco"-morpholine (principally N-laurylmorpholine derived from coconut oil); N-"tallow"-morpholine (alkyl=principally hexadecyl, octadecyl and octadecenyl derived from tallow); 1-β-hydroxyethyl-2-heptadecenyl-glyoxalidine.

The following examples further illustrate the invention but are not to be construed as limitations thereof.

Example I 1000 lbs. of ore containing 2.5 lbs. of $U_3O_8$ are crushed and ground with water to about a 12 mesh (Tyler Standard Screen Scale). To the aqueous ore slurry there is added 12.8 lbs. of sulfuric acid (98 wt. percent) and 5 lbs. manganese dioxide to give a sulfuric acid concentration in the slurry of about 1.2 wt. percent and a manganese dioxide concentration of 0.5 wt. percent of the basis of the ore. The ore is leached with the aqueous sulfuric acid for a 24 hour period at 25° C. under agitation conditions. The insoluble ore solids are separated from the uranium loaded leach liquor in a countercurrent decantation circuit and the ore solids are discarded. The clarified leach liquor has an analysis of 0.72 gram of $U_3O_8$/liter.

A portion of the clarified acid leach liquor in an amount of 5000 mls. is placed in a battery jar and is extracted by agitation (shaking) with two 500 mls. portions of amine-kerosene solution and the extract solution is then separated from the acid leach liquor by decantation.

The amine-kerosene solution is prepared by dissolving 36 grams of Rohm & Hass Amberlite 9D–178 amine of the formula:

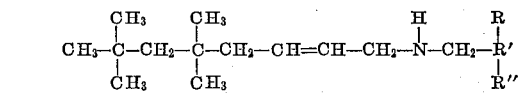

where $R+R'+R''=11–14$ carbon atoms, in 1,000 mls. of kerosene made water white by clay treatment.

The two extract kerosene portions are composited as a yellow turbid solution and the recovered 990 mls. of kerosene extract solution is analyzed and found to contain 0.34 wt. percent uranium indicating a 94% recovery of uranium.

Example II

One hundred mls. of amine-kerosene extract solution of Example I are mixed with 1 gram of ammonium sulfate dissolved in 50 mls. of distilled water and introduced into an open end glass tube. The filled tube is placed in a glass lined autoclave. Three small nickel turnings weighing 3.5 grams are then inserted in a tube and the tube is placed in an autoclave. The autoclave is flushed with hydrogen, pressured with hydrogen to 500 p.s.i.g. and heated at 148° C. for 5 hours. The autoclave is cooled, vented and the glass tube withdrawn. The kerosene layer turns from a yellow to a brown color, the water and kerosene layers are separated, and 50 mls. of water and 98 mls. of kerosene solution are recovered. Black specks of uranous oxide ($UO_2$) are present in the water layer and recovered by filtration. Only 0.14 wt. percent uranium remained in the kerosene layer indicating 59% of the uranium precipitated.

Example III

Twenty-five mls. of amine containing kerosene extractant solution of Example I and 25 mls. of distilled water is placed in a rhodium plated 100 mls. graduate. The graduate is placed in an autoclave and the autoclave is flushed with hydrogen. The autoclave is pressured with hydrogen for 8 hours at 144–157° C. under 2000 p.s.i.g. pressure. The autoclave is then cooled, depressured and the graduate withdrawn. Dissolved hydrogen bubbles off. The following observations are made: A small black ring is observed around the inside of the graduate at the hydrogen-kerosene interface. Several black and brown specks noted in suspension in both water and kerosene layers. This rhodium plating that has been in the kerosene layer is white while the plating in the water layer has acquired a brownish cast. Both the kerosene and water layers are filtered and the rhodium surface scraped with a "policeman." The solids are composited and dried under a heat lamp and identified as primarily $UO_2$. It is found by analysis the uranium content remaining in the kerosene layer is reduced from 0.34 wt. percent to 0.094 wt. percent indicating 72% of the uranium precipitated.

Example IV

Two hundred fifty mls. of barren leach liquor raffinate of the type set aside in Example I containing 0.002 gram of $U_3O_8$ per liter is placed in a 2 inch open glass tube and three drops of aqueous ammonium hydroxide (28 wt. percent) are added. The tube is placed in an autoclave and heated to 149° C. under a hydrogen pressure of 1100 p.s.i.g. for 5 hours. The autoclave is cooled, vented and the tube removed from the autoclave. The raffinate solution turned from a light green-blue color to nearly water white. A rather large amount of brown precipitate is found at the bottom, the clear liquid is decanted from the precipitate. The precipitate is dried on a hot plate and weighed and found to contain 1.2 grams containing 0.012% of uranium or a recovery of 34%.

Example V

Two hundred fifty mls. of raffinate (252 grams) of the type produced in Example I are placed in a 2 inch diameter open end glass tube and three drops of aqueous ammonium hydroxide (28 wt. percent) were added. The tube is placed in an autoclave and aluminum wire was used to suspend a nickel strip (4″ x ½″ x 1/16″). The aluminum wire just touched the solution. The autoclave is flushed with hydrogen and heated at 149° C. for 5 hours under a hydrogen pressure of 500 p.s.i.g. The autoclave is cooled, vented and the tube withdrawn. The liquid (224 mls., 226 grams) had a pale green color. Considerable precipitate is formed on the wire of the strip and these are scraped and submitted for analysis. Precipitate on the bottom tube weighs 0.2143 gram after drying. Analysis of the liquid filtrate finds it to contain 0.00045 gram of $U_3O_8$ per liter indicating that 80% of the uranium is precipitated.

We claim:

1. A process for the recovery of actinide values from an aqueous inorganic mineral acid first solution containing said values comprising contacting said first solution with a second solution comprising a substantially water insoluble, nonpolar, inert organic solvent and a member selected from the group consisting of:

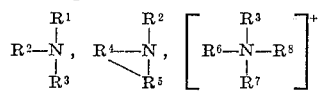

where $R^1$ and $R^2$ are selected from the group consisting of hydrogen, alkyl, and alkyl and alkylene radicals having at least one substituent selected from the group consisting of aryl, hydroxyl, amino and alkoxyl, $R^3$, $R^{6,}$ $R^7$ and $R^8$ are selected from the group consisting of alkyl radicals, and alkyl and alkylene radicals having at least one substituent selected from the group consisting of aryl, hydroxyl, amino, alkoxyl and $R^4$–$R^5$ represent the polymethylene group, the total number of carbon atoms in said member being at least 10, whereby most of said actinide values are extracted into said second solution, separating the actinide loaded second solution from the remaining stripped first solution, contacting the separated second solution with hydrogen at a temperature between about 50 and 250° C. under a hydrogen pressure of between 100 and 2000 p.s.i.g. thereby precipitating said actinide values and then recovering the precipitated solid actinide value, contacting the separated remaining stripped first solution with hydrogen at a temperature between about 50 and 250° C. under a pressure between about 100 and 2000 p.s.i.g. and recovering the precipitated actinide value therefrom.

2. A process in accordance with claim 1 wherein the hydrogen contacting of said separated second solution and said stripped first solution is conducted in the presence of hydrogenation catalyst and water, said hydrogenation catalyst being a member selected from the group consisting of the Group VI and Group VIII metals of the Periodic Table and oxides thereof.

3. A process in accordance with claim 2 wherein said actinide values are uranium values, said inorganic acid is sulfuric acid, and said amine is N-dodecenyltrialkylmethyl amine, said trialkyl having 12 to 15 carbon atoms, and said organic solvent is kerosene.

4. A process of recovering actinide values from an aqueous inorganic mineral acid first solution containing said values which comprises contacting said first solution with a second solution comprised of a substantially water immiscible nonpolar, inert, organic solvent and a member selected from the group consisting of:

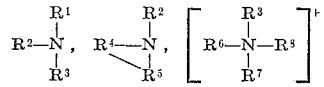

where $R^1$ and $R^2$ are selected from the group consisting of hydrogen alkyl radicals, and alkyl and alkylene radicals having at least one substituent selected from the group consisting of aryl, hydroxyl, amino and alkoxyl, $R^3$, $R^6$, $R^7$, and $R^8$ are selected from the group consisting of alkyl radicals and alkyl and alkylene radicals having substituent selected from the group consisting of aryl, hydroxyl, amino, alkoxyl and $R^4$–$R^5$ represent a polymethylene group, the total number of carbon atoms in said member being at least 10, whereby said actinide value is extracted into said second solution, separating the actinide containing second solution from the stripped first solution, contacting said actinide containing second solution with hydrogen under a hydrogen pressure of between about 100 and 2000 p.s.i.g. at a temperature between about 50 and 250° C. thereby precipitating said actinide values and then recovering the precipitated solid actinide values therefrom.

5. A process in accordance with claim 4 wherein said second solution is contacted with hydrogen in the presence of hydrogenation catalyst and water, said hydrogenation catalyst being a member selected from the group consisting of Group VI and Group VIII metals of the Periodic Table and oxides thereof.

6. A process in accordance with claim 5 wherein said actinide values are uranium values, said inorganic acid is sulfuric acid, said inert organic solvent is kerosene, said amine is N-dodecenyltrialkylmethylamine, said trialkyl having 12 to 15 carbon atoms, and said catalyst is nickel.

7. A process in accordance with claim 5 wherein said mineral acid is sulfuric acid solution, said amine is N-dodecenyltrialkylmethylamine, said trialkyl having 12 to 15 carbon atoms, said inert organic solvent is kerosene, said catalyst is rhodium and said actinide value is a uranium value.

8. A process in accordance with claim 1 wherein said inorganic acid is sulfuric acid.

9. A process in accordance with claim 1 wherein said inorganic acid is sulfuric acid, said actinide value is uranium, and the contacting of said stripped first solution is accomplished in the presence of hydrogenation catalyst selected from the group consisting of Group VI and Group VIII metals of the Periodic Table and oxides thereof.

10. A process in accordance with claim 9 wherein said catalyst is nickel.

References Cited by the Examiner

UNITED STATES PATENTS

| | | | |
|---|---|---|---|
| 2,727,806 | 12/1955 | Forward et al. | 23—14.5 |
| 2,877,250 | 3/1959 | Brown et al. | 23—14.5 |
| 3,115,388 | 12/1963 | Goren | 23—14.5 |

CARL D. QUARFORTH, *Primary Examiner.*